United States Patent [19]

Johns

[11] 4,376,745

[45] Mar. 15, 1983

[54] PARTICLE BOARD PROCESS USING FURAN RESIN/ISOCYANATE BINDER

[75] Inventor: William E. Johns, Pullman, Wash.

[73] Assignee: Washington State University Research Foundation, Pullman, Wash.

[21] Appl. No.: 273,512

[22] Filed: Jun. 15, 1981

[51] Int. Cl.³ .............................................. B29J 5/00
[52] U.S. Cl. ................................................... 264/109
[58] Field of Search ......................................... 264/109

[56] References Cited

U.S. PATENT DOCUMENTS 4,257,995  3/1981  McLaughlin et al. .............. 264/109
4,257,996  3/1981  Farrissey et al. .................... 264/109
4,258,169  3/1981  Prather et al. ....................... 264/109

Primary Examiner—James R. Hall
Attorney, Agent, or Firm—Gerald T. Shekleton

[57] ABSTRACT

A binder for use in the preparation of particle boards comprising blends of polyisocyanate and furan resins.

3 Claims, 4 Drawing Figures

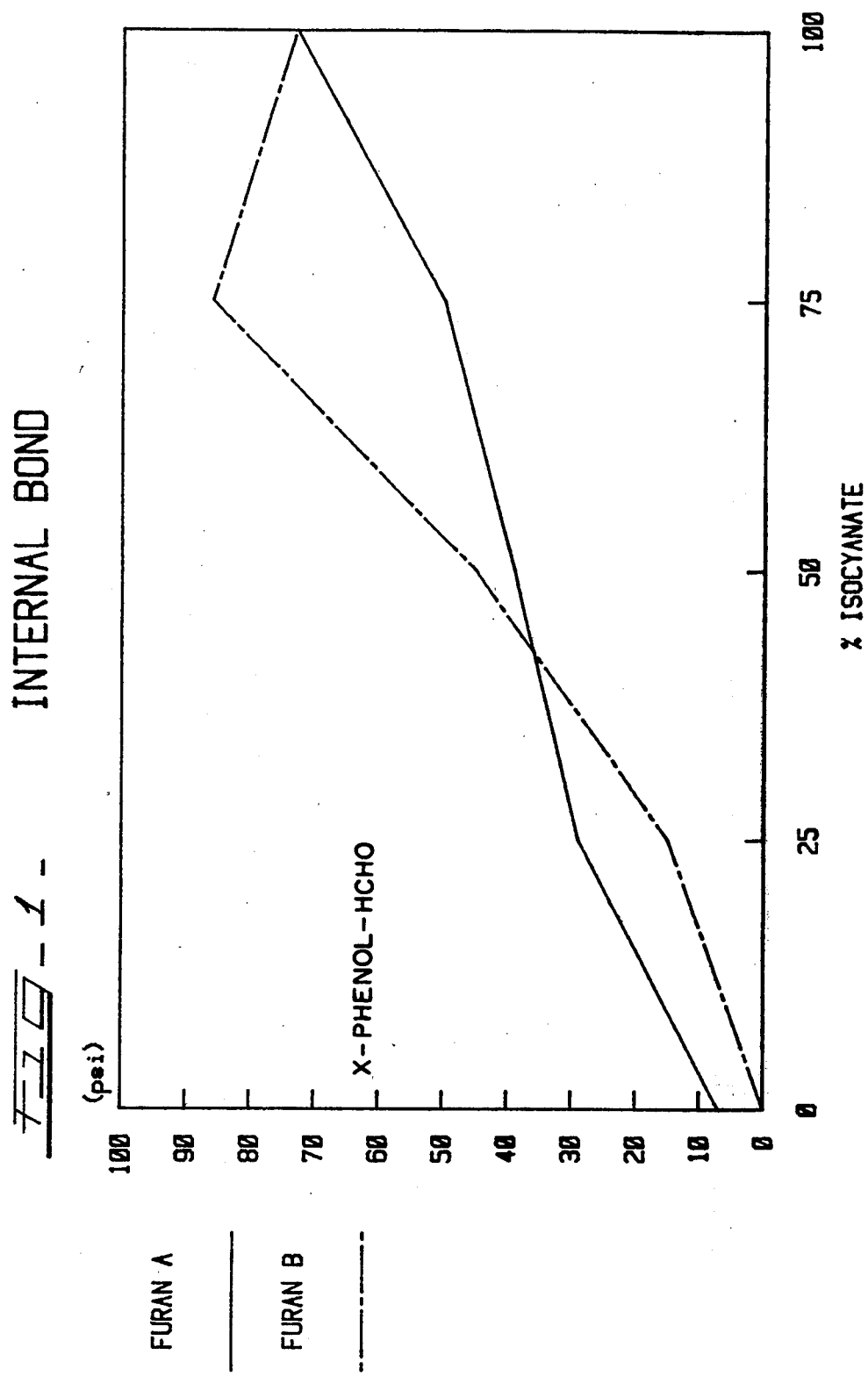

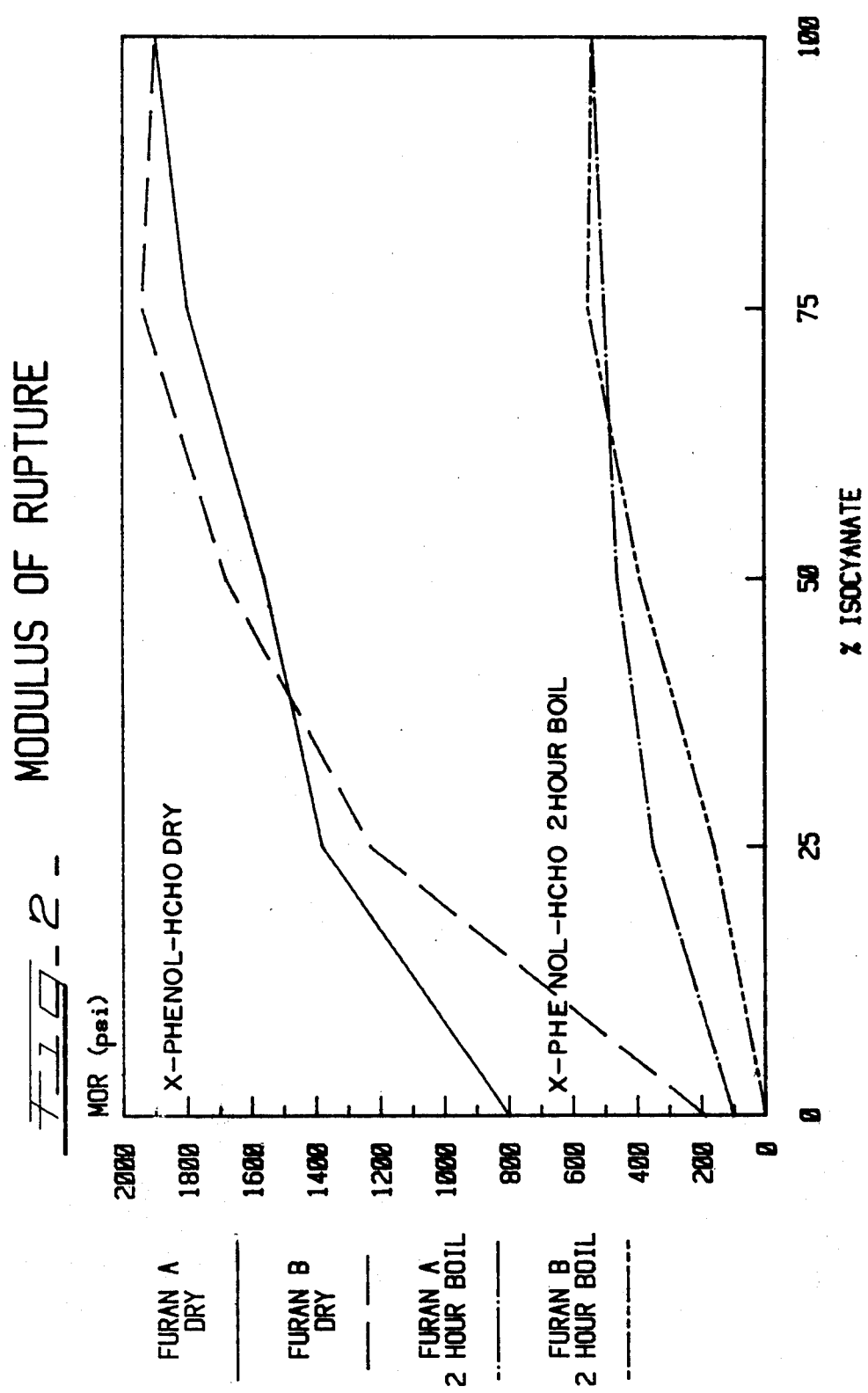

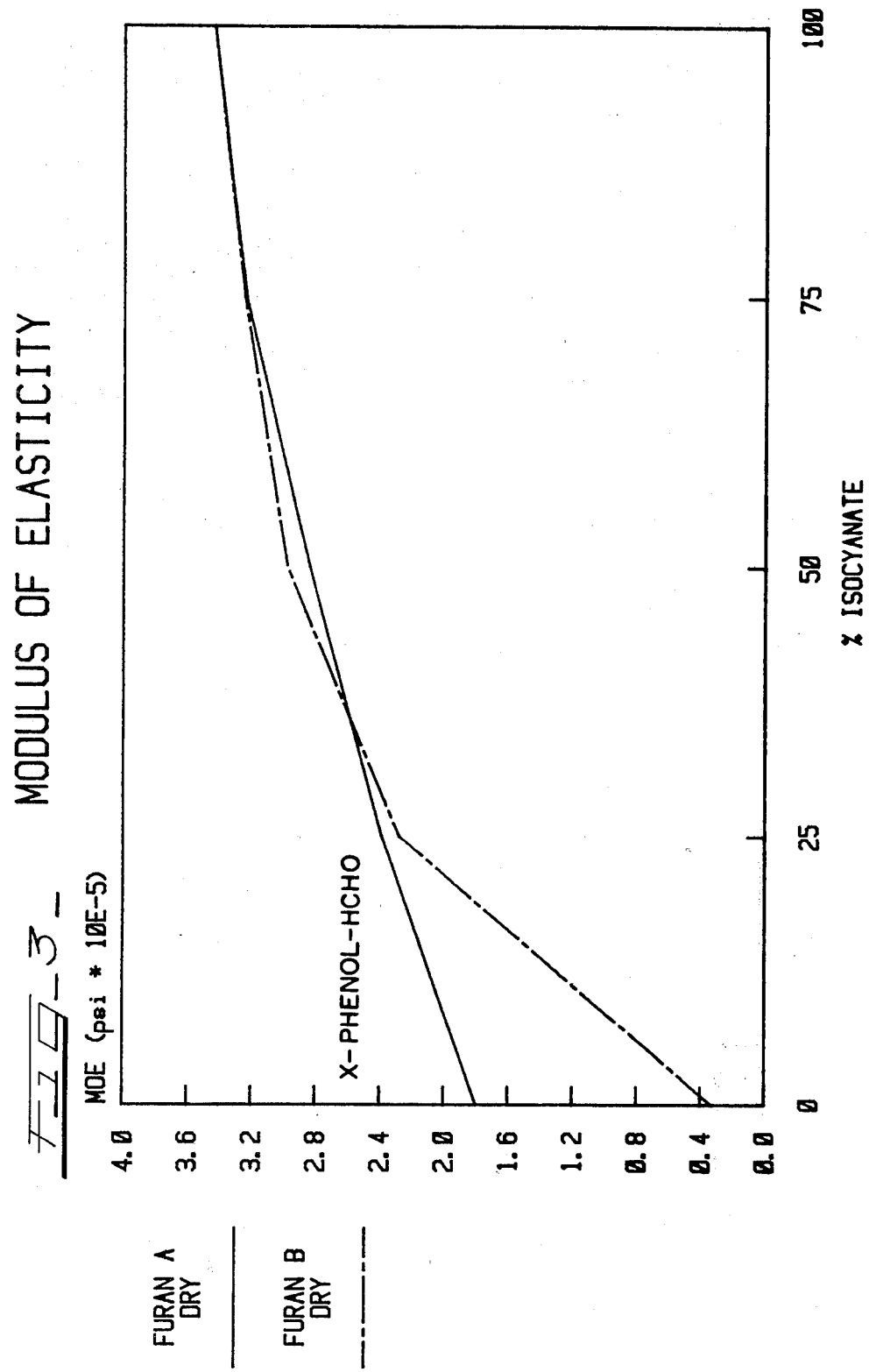

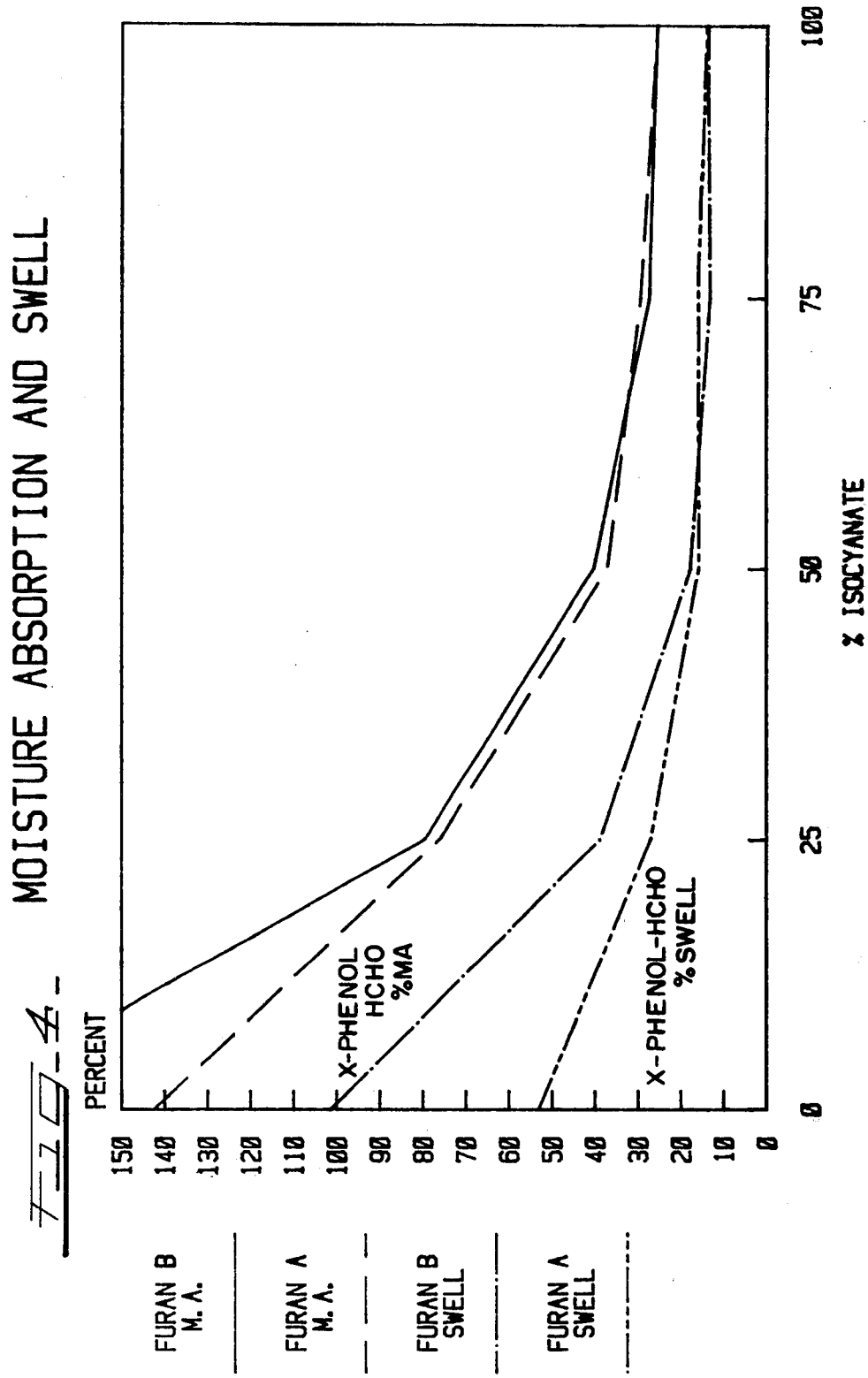

PARTICLE BOARD PROCESS USING FURAN RESIN/ISOCYANATE BINDER

This invention relates to copolymer binders comprising blends of furan resins and isocyanates and more particularly to the use of such furan resin-isocyanate binders in the manufacture of particle boards.

BACKGROUND OF THE INVENTION

In the past, 4 resins, phenol-formaldehyde, melamine-formaldehyde, isocyanate and urea-formaldehyde resins, have been most commonly used for commercially produced interior and exterior particle boards. Of these resins, phenol formaldehyde resins have become the standard by which all resins are measured, chiefly because they are relatively inexpensive, and have sufficient hydrolytic resistance for exterior applications. However, phenolic resins have a relatively slow cure rate and usually require resin in excess of that normally necessary to be used to overcome the swelling tendencies of cellulose materials when exposed to moisture and caustic. Phenolic resins are insensitive to overcure, and do not stick to molding apparatus. A second, though less popular resin, melamine-formaldehyde, is generally comparable to phenolic resins, however, is more expensive. The third commercially popular resin in use are the polymeric isocyanates, as discussed in the report, "*The 11th Particleboard Proceedings,*" Washington State University, 1977. Isocyanate resins are as good if not better in water resistance properties as phenolic resins, and in addition are fast curing, though expensive. Primarily because isocyanate resins can be used at approximately one-half the rate of application of phenolic resins to achieve the same strength board, while at the same time using less wood, and because of their inherently faster rate of cure, the cost differential between isocyanates and phenolic resins is becoming smaller. Boards bonded with an isocyanate resin, when compared to phenolic resins of the same strength, are lighter and therefore easier to handle at a job site. Being lighter, they are less expensive to ship and thus are a preferred product. The remaining resin, urea-formaldehyde is appropriate for use in interior boards only, as a result of its inherent instability in the presence of moisture.

SUMMARY OF THE INVENTION

Therefore, an object of the subject invention is an improved binder for use with particle boards and the like.

Another object of the subject invention is an improved binder comprising a blend of isocyanate and furan resins.

Another object of the subject invention is an improved binder comprising a blend of isocyanate and furan resins, which is comparable or better in physical properties than other phenol-formaldehyde resins or isocyanate resins alone.

These and other objects are obtained in accordance with the subject invention wherein there is provided an improved binder comprising a blend of polymeric isocyanate and furan resins thereby providing the copolymer binder of the subject invention. Such copolymers were prepared by mixing a furan resin with the isocyanate, adding an activator solution (50 percent solution of Maleic anhydride in furfural in amounts equivalent to 10 percent of maleic anhydride per total furan resin components present) then diluting to a lower viscosity as desired with a solvent such as acetone or furfural. In utilizing the binder of the subject invention for the preparation of exterior and interior particle board, wood chips and resin are blended in a rotating drum blender using a pressurized spray head or other blenders familiar to those skilled in the art. Typical boards may be prepared based on 3 percent resin solids on the basis of oven dry wood. Randomly oriented boards of the desired thickness, may be felted to a desired density and pressed at a certain temperature (275° F.-450° F.) for a period of time (3-8 minutes) depending on thickness. When utilizing the binder of the subject invention, comprising a 5-50 percent furan resin with isocyanate, the physical properties of the resulting boards, i.e., modulus of elasticity, modulus of rupture, internal bond, percent thickness swell, and water absorption after a 24 hour soak, are each equivalent to or better than both phenolic resins and 100 percent isocyanate resins as measured by the ASTM D1037 test standard.

FIG. 1 is a graph of the relationship between the percent isocyanate and two furan resins and the internal bond (1B) of the respective particle board.

FIG. 2 is a graph of the relationship between mixtures of isocyanate and two furan resins and the modulus of rupture (MOR) of their respective particle boards.

FIG. 3 is a graph of the relationship between mixtures of isocyanate and two furan resins and the modulus of elasticity (MOE) of their respective particle board.

FIG. 4 is a graph of the relationship between mixtures of isocyanate and two furan resins and the percent moisture absorption and swell of the respective particle boards formed therefrom.

DETAILED DESCRIPTION OF THE INVENTION

The binder of the subject invention comprises a resin including a combination of a furan resin and an isocyanate resin. With the resin binder of the subject invention, particle board among other articles, may be produced by bonding together particles of wood or other cellulosic or organic material capable of being compacted, using heat and pressure in the presence of the binder system.

The polyisocyanate component of the binder system can be any organic polyisocyanate composed primarily or predominately of molecules which contains at least two isocyanate groups per molecule. Illustrative of organic polyisocyanates are resin based diphenylmethane diisocyanate, m- and p-phenylene diisocyanates, chlorophenylene diisocyanate, $\alpha,\alpha$-sylene diisocyanate, 2,4- and 2,6-toluene diisocyanate and the mixtures of these two isomers which are available commercially, triphenylmethane triisocyanates, 4,4'-diisocyanate diphenyl ether, and polymethylene polyphenyl polyisocyanates. Other polyisocyanates are also available in various modified forms and are included within the scope of the subject invention. The polyphenyl polyisocyanates are the preferred polyisocyanates for use in the binder systems of the subject invention. Particularly preferred polyphenyl isocyanates are those resins based on 4,4'-diphenylmethane diisocyanate.

The furan resin component of the binder system of the subject invention can be any furan resin and includes those furan resins made by homopolymerization of furfuryl alcohol or copolymerization of furfuryl alcohol with formaldehyde, which are characterized by the presence of a variety of resinous components including homologs of difurfurylmethane, difurfuryl ether and furfuryl alcohol. In addition to polyfunctional species other furan resins include resinous high hydroxymethyl furan formaldehyde condensation products, i.e., furan-formaldehyde condensation products in which the majority (over 70 percent) of the molecules are polyhydroxylmethylated or two or more hydroxymethyl substituents. Such high hydroxymethyl furan formaldehyde condensation products may include a mixture of monomeric and polymeric 2,5-bishydroxymethyl furan. Other furan resins which may be included in the binder system of the subject invention include furfuryl-acetone resins and the like. Any wood particle which can be bonded with standard adhesives, such as phenol-formaldehyde, urea-formaldehyde, or polyisocyanate, can be bonded with the mixtures described in this patent. These include, for example, hardwoods such as aspen, oak and maple or softwoods such as pines, firs and spruces. These species are offered for example and are not meant to suggest limits. Flake geometry can be of any shape, from individual fibers as normally used for the production of low, medium or high density fiberboard, to ring-cut flakes, drum-cut flakes or disc-cut flakes, including strands and wafers. Wood particles can be formed into the mat in a random manner, or they may be oriented in single or multilayer mats. As known in the art, particles of other cellulosic materials such as shredded paper, pulp or vegetable fibers such as corn stalks, straws, bagasse and the like, and of non-cellulosic materials such as scrap polyurethane, polyisocyanurate and like polymer foams can also be used. The methods for producing suitable particles are well known and conventional. If desired, mixtures of cellulosic particles may be used.

Particle board is traditionally fabricated by spraying the cellulosic or wood chip particles with the components of the binder composition either separately or in combination while the particles are tumbled or agitated in a blender or like mixing apparatus. Generally the binder system is added in an amount equal to 1½–16 percent by weight of the cellulosic material based on the dry weight of the particles. If desired other material such as fire retardants, pigments and the like may also be added to the particles during the blending stage.

After blending sufficiently to form a uniform mixture the coated particles are formed into a loose mat or felt, preferably containing between about 4 percent and 18 percent moisture by weight. The mat is then placed in a heated press (275°–450° F.) between caul plates and compressed (200–1200 psi) to consolidate the particles into a board. Pressing times, temperatures, and pressures may vary widely, depending on the thickness of the board produced, the desired density of the board, the size of the particles used and other factors well known in the art. The examples cited herein below were boards prepared with 3 percent resin solids on an oven dry wood basis to form ⅜" thick boards, felted to a target density of 0.6 g/cc and pressed at 500 psi and 350° F. for 4½ minutes. The boards thus prepared were tested for modulus of elasticity (MOE), modulus of rupture (MOR), internal bond (IB), percent thickness swell, and water absorption after a 24 hour soak. In addition a wet MOR or bending strength after 2 hour boil-15 minute cold soak, was conducted. The results of these tests are summarized in Table I below and depicted in FIGS. 1 through 3. In FIGS. 1–3 the variation of the physical properties of Furan A, a blend of an isocyanate resin and a furfuryl alcohol-FCHO resin and Furan B, a blend of an isocyanate resin and a furfuryl alcohol homopolymer are shown according to changes in the relative compositions in each.

TABLE 1

Summary of Boards Made With Furan—Isocyanate Resin Blend

| Resins Blended | Ratio ISO:Furan | Diluent | Modulus of Elasticity psi × 10⁵ | Modulus of Rupture psi Dry | Modulus of Rupture psi Wet | Internal Bond psi | Thickness Swell % | Water Absorption % |
|---|---|---|---|---|---|---|---|---|
| Isocyanate/ | 4:0 | none | 3.44 | 1900 | 540 | 73 | 13.85 | 25.24 |
| Furfuryl Alcohol- | 3:1 | acetone | 3.24 | 1800 | 500 | 50 | 15.91 | 29.21 |
| FCHO Resin | 1:1 | acetone | 2.84 | 1560 | 460 | 39 | 15.68 | 36.97 |
| Blend - | 1:3 | acetone | 2.39 | 1380 | 350 | 29 | 26.93 | 76.04 |
| "Furan A" | 0:4 | acetone | 1.80 | 800 | 100 | 7 | 52.96 | 142.32 |
| Isocyanate/ | 4:0 | none | 3.44 | 1900 | 540 | 73 | 13.85 | 25.54 |
| Furfuryl Alcohol- | 2:1 | acetone | 3.25 | 1940 | 550 | 86 | 13.05 | 27.25 |
| Homopolymer | 1:1 | acetone | 2.98 | 1680 | 390 | 45 | 17.57 | 40.16 |
| Blend - | 1:3 | acetone | 2.28 | 1230 | 160 | 15 | 38.69 | 79.47 |
| "Furan B" | 0:4 | acetone | 0.33 | 190 | 0 | 0 | 101.31 | 191.04 |
| Phenol-formaldehyde Resin | — | — | 2.62 | 1860 | 620 | 61 | 25.73 | 95.51 |

Generally speaking when the furan resins are present at about 25 percent of resin solids the physical properties tested showed basic equivalency or superiority with the physical property values experienced for both 100 percent isocyanate resins and 100 percent phenyl formaldehyde resins. Of particular interest is the graph of FIG. 1 which shows that a binder incorporating a 3:1 level of isocyanate to furfuryl alcohol homopolymer has an internal bond that is superior to that of the isocyanate alone or the phenyl formaldehyde resin. It is generally recognized that the internal bond properties of a given composition board comprise the best indication of resin efficiency in the board. As a result, not only are the fast-curing properties and water resistance of isocyanate retained, but the overall physical properties of particle board are improved as well. The result is an excellent exterior particle board which has excellent water resistance.

The furan-isocyanate binders of the subject invention may be utilized in areas other than for the production of particle board such as in a glue for plywood, as a binder for both high and medium density fiberboard, composite boards manufactured by sandwiching a layer or layers of particles of various origin between layers of wood boards, wood veneers, or fiberglass, as a binder for glass fibers, and as a binder for other mineral fibers. Other uses not stated above may also be possible.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A process for the preparation of a particle board comprising the steps of blending a polyisocyanate with a furan resin to form a binder, mixing said binder with wood chip particles and molding said mixture of binder and cellulosic material under heat to form said particle board.

2. The process of claim 1 wherein said binder and said wood chip particles are molded at 350° F. for 4½ minutes at 500 psi.

3. The process of claim 1 wherein said furan resin is blended with said polyisocyanate to form a solution having a furan resin content of from 5–50 percent.

* * * * *